Patented May 11, 1937

2,080,212

UNITED STATES PATENT OFFICE 2,080,212

CONTROL MECHANISM FOR DAMPERS AND THE LIKE

Carl A. Otto, Milwaukee, Wis., assignor to Johnson Service Company, Milwaukee, Wis., a corporation of Wisconsin Application October 15, 1934, Serial No. 748,388

18 Claims. (Cl. 236—82)

This invention relates to servomotors of the expansible chamber type which are commonly used to operate dampers, valves and other temperature, pressure and flow control devices. Such mechanisms are commonly used in temperature regulation and ventilating fields and the present invention, while not confined to that field is particularly suited thereto.

It is commonly desirable to control progressively throughout its entire range of motion, a damper, valve, or other device, such control being in response to atmospheric conditions such as temperature or humidity. Pneumatic systems are very extensively used in the temperature regulating art, and since such systems involve the use of compressed air, there is an extensive use of compressed air motors to operate such dampers.

Heretofore it has been the practice to use a single-acting damper motor with an opposing spring, the position of the damper being established by establishing a varying pressure in the motor. The objection to such systems is that in each adjusted position the motor and the spring are in equilibrium and the motive fluid is elastic. Consequently, the damper can flutter or move through a considerable range from its intended adjusted position under the influence of wind pressure and the like.

According to the present invention a double-acting pneumatic motor is used, that is, a motor having two working spaces in which pressure is developed, the effect of the pressure in one space being opposed to pressure in the other. The controlling mechanism is so contrived as to develop in the working spaces corrective pressure differentials as an incident to motion of the damper from the adjusted position, and in this way a positive resistance is built up to any fluttering motion of the damper. This use of opposing working spaces with a corrective valve mechanism is the broad principle of the invention.

Another feature is the use as parts of the control mechanism of progressive relays of the leak-port type which are standard articles of commerce in the temperature regulating field, and consequently readily available and readily understood by the maintenance engineers who will have to deal with them.

Broadly considered the invention contemplates a double-acting motor, a pilot valve mechanism controlled conjointly by the position of the motor and by the indications of a responsive device such as a thermostat or humidistat, and means which may include relays, serving to translate the action of the pilot valve device into variable pressures in the corresponding working spaces of the double-acting motor. For each indication of the responsive device there is a corresponding balanced or neutral position of the control device. An important characteristic of the invention is the fact that in this neutral position both working spaces are under pressure so that the motor functions positively to retain the actuating devices in such neutral position at all times. In the preferred construction, both motors are under full pressure in the neutral position. The desired result can be secured in various ways, some of which will be disclosed specifically hereafter.

If the pilot valve mechanism is so contrived as to produce reverse effects for the two working spaces, then the leak-port relays may be identical. On the other hand, if the pilot valve mechanism produces the same variation for both ends of the double-acting motor, then one of the leak-port relays is of the direct-acting type (that is, it produces a branch line pressure which varies directly with the variation of the control pressure), and the other is of the reverse-acting type (that is, it produces a branch line pressure which varies inversely with the variation of the control pressure). The two arrangements are approximate equivalents, and the two are illustrated to explain the general applicability of the invention and the broad general principles upon which it is based.

The invention will now be described in connection with the accompanying drawings in which:

Fig. 3 is a fragmentary view of the damper, showing a modification.

Fig. 4 is a similar view showing another modification.

Figure 1:
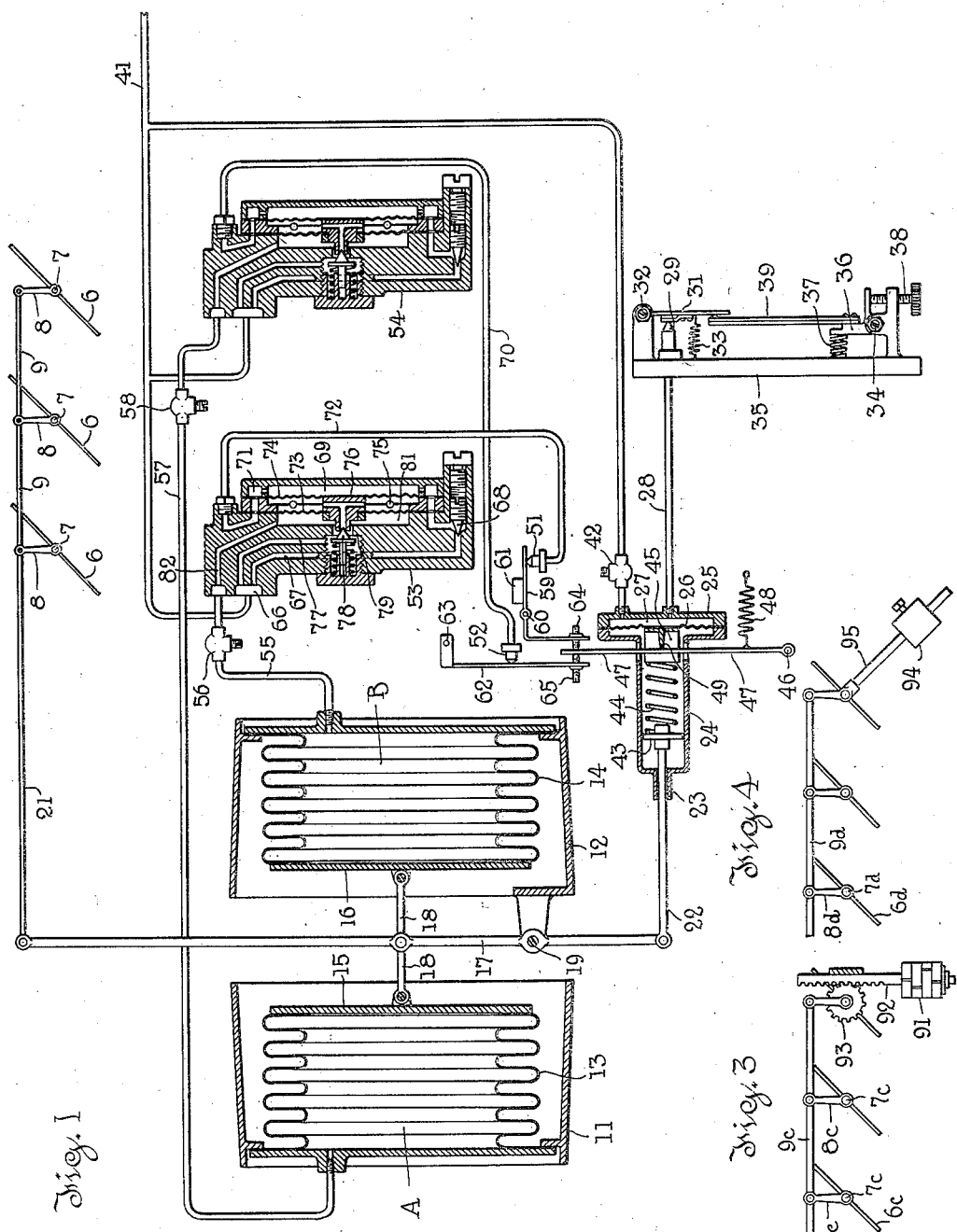
Fig. 1 shows, largely in sectional diagram, an installation in which the necessary pressure change reversal is secured in the pilot valve mechanism and the relays are of the same type.

Referring first to Fig. 1, 6 indicates the blades or louvers of a damper, each such blade being pivoted at 7 and actuated by arms 8 which are connected to act in unison by links 9. A double-acting damper motor is made up of two housings 11 and 12 which are rigidly supported by any means (not shown), and two expansible metallic bellows 13 and 14 supported on the respective housings and carrying movable heads 15 and 16. The heads 15 and 16 are connected to each other and to a lever 17 by the links 18, the lever 17 being fulcrumed at 19 on the housing 12, and being connected by the link 21 with the damper mechanism. In this way two variable volume working spaces are formed within the bellows, and for convenience of designation these will be indicated as working space A and working space B.

The lever 17 is extended beyond the fulcrum 19 and is connected with a plunger 22 which is fitted loosely in a guideway 23 formed in the end of the housing 24. The forward end of housing 24 is enlarged and is provided with a cup-shaped cap 25 which clamps a flexible diaphragm 26 against the open end of the housing, and with the diaphragm forms a chamber 27 from which there leads a bleed connection 28. Connection 28 leads to the leak-port 29 of a leak-port thermostat of familiar type. This includes a valve pad 31 pivoted at 32, and urged against the leak-port by a tension spring 33. Pivoted at 34 on the base 35 which also supports the leak-port 29 is a saddle 36. This is urged in a clockwise direction by a coil compression spring 37 and is adjustable in position by an adjusting screw 38. The saddle 36 carries the thermostatic element 39 which takes the form of a bi-metallic bar. The bar flexes on changes of temperature, and in so doing moves the valve member 31 away from the leak-port 29, or permits it to move into throttling relation therewith, the effect being to vary the rate of venting of the chamber 27.

An air supply line 41 leads from any suitable source of compressed air, and has a branch which leads through the throttle valve 42 to the space 27. The valve 42 is adjusted to a capacity less than the maximum capacity of the leak-port 29 so that the variable throttling of the leak-port 29 establishes a varying pressure in chamber 27. The motion of the plunger 22 establishes a varying opposing force upon the diaphragm 26 by means of the spring seat 43 carried on the end of the plunger 22, the coil compression spring 44, and the spring seat 45 which bears against the diaphragm 26. Consequently, for each pressure established in the chamber 27 as a result of the indications of the thermostat, there is a corresponding position of the lever 17 which will exert a balancing force on the diaphragm 26.

Pivoted on a fixed fulcrum 46 is a lever 47 which is drawn by a tension spring 48 into contact with a knife edge 49 on the spring seat 45, and consequently assumes positions corresponding to the positions of the diaphragm 26. There are two leak-ports 51 and 52 which control the pressure in the control chambers of two identical relays indicated generally at 53 and 54, the relay 53 being connected through the branch line 55 and throttling needle valve 56 with the working space B, and the relay 54 being connected through the branch line 57 and throttling needle valve 58 with the working space A.

The leak-port 51 is controlled by a valve element which takes the form of a bell-crank 59 fulcrumed at 60 and weighted at 61 to cause it to move in a port-closing direction. The leak-port 52 is controlled by a valve element which takes the form of a lever 62 mounted on an offset fulcrum 63 in such a way that the valve gravitates in a port-closing direction. The upper or free end of the lever 47 lies between adjustable thrust screws 64 (in lever 59) and 65 (in lever 62).

As clearly indicated in the drawings, the parts are so arranged that in the neutral position of lever 47 the ports 51 and 52 are closed by their respective valve elements, but the slightest motion of the lever 47 from such neutral position will open the leak-ports selectively, according to the direction and amount of such motion.

The two relays 53 and 54 are identical and are constructed according to the disclosure in patent to Otto, No. 1,500,260 dated July 8, 1924, omitting the bi-metallic bar 32 of that patent and the parts which support it. A very brief description of the relay 53 will suffice for an understanding of the operation of the device, and if more elaborate discussion is necessary reference may be made to the patent just identified.

A branch from the air supply line 41 leads to cavity 66 from which lead two passages. The passage 67 leads past a needle throttling valve 68 to the space 69 in front of the larger diaphragm of the differential diaphragm mechanism made up of two spaced diaphragms 73 and 74 of different areas. Space 69 is vented through the passage 71 and pipe 72 which leads to the leak-port 51 already described. Since the needle valve 68 is adjusted to a flow capacity less than the maximum capacity of port 51, the variable throttling of port 51 establishes a variable pressure in the chamber 69, which is the regulatory chamber. The diaphragms 73 and 74 are connected together at their centers by a hub 76 ported as shown, the port being an exhaust port leading axially through the hub and thence to the space between the diaphragms which is vented to atmosphere at 75. A passage 77 leads from cavity 66 to the space surrounding a spring-urged needle valve 78, which is a combined admission and exhaust valve. It acts as an exhaust valve by entering the port in the hub member 76 and as an admission valve by coacting with the annular seat 79. Thus as the diaphragms move forward (to the right) the valve 78 seats on 79 and then exposes the exhaust port through the hub 76. The effect is to control the pressure in a space 81 which is connected by a passage 82 through the needle valve 56 and branch line 55 with the working space B.

Since relay 54 is identical with relay 53 reference numerals indicating its component parts have been omitted except that the pipe analogous to the pipe 72 is indicated by the numeral 70.

It will be readily understood from Fig. 1 that just as the leak-port 51 is connected to control the relay 53, the leak-port 52 is connected to control the relay 54, and just as the branch line 55 and needle valve 56 are interposed between the relay 53 and working space B, the branch line 57 and needle valve 58 are interposed between the relay 54 and the working space A.

The operation of the device can now be traced quite readily. Variations in temperature cause variable flexure of the thermostatic bar 39, and consequently establish variable throttling rates at the port 29. As a result, a definite pressure is established in chamber 27 for each temperature. For each such pressure in chamber 27 there is a corresponding position for the lever 17 which will so stress spring 44 that lever 47 will assume its neutral or mid position in which both the leak-ports 51 and 52 are closed and in which the relays consequently function to establish the full pressure from line 41 in the working spaces A and B. If the lever 17 moves ever so slightly from the position just defined, one or the other of the leak-ports 51 or 52, as the case may be, will be opened slightly, the effect being to reduce the pressure in the corresponding working space B or A, as the case may be. The effect is to establish a corrective pressure differential which will shift lever 17 enough to cause restoration of lever 47 to its neutral position.

While I have described an arrangement in which the neutral position of the lever 47 permits both leak-ports 51 and 52 to be closed, the device will also operate if the adjustment be such that in the mid position of the lever 47 the leak-ports 51 and 52 are partially but not fully open. In such slightly open position of the leak-ports, equal pressures will be established in the working spaces A and B, but because of the action of the relays such pressures will be somewhat less than the pressure in the supply line 41. With this arrangement the effect of displacing the lever 47 from its mid position is to increase the pressure in one working space slightly, and at the same time diminish it slightly in the other. The operative characteristics are essentially similar, and the selection of one or the other adjustment will depend somewhat on the character of the service required from the device.

The function of the needle valves 56 and 58 is to throttle flow to and from the working spaces and thus slow up the motion of the lever 17.

Figure 2:
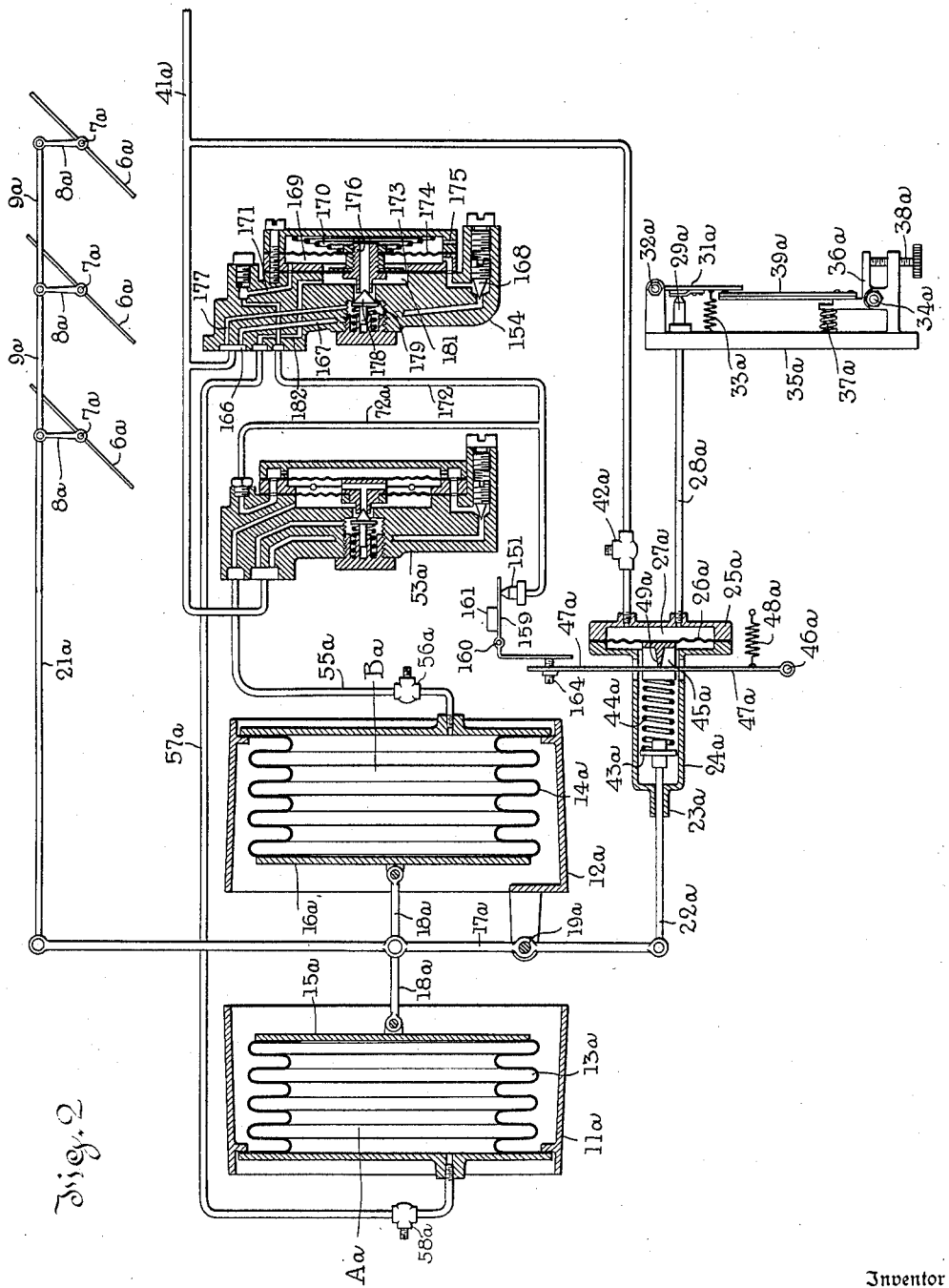
Fig. 2 shows a similar installation in which the relays are differentiated and the pilot valve control mechanism is identical for the two working spaces.

Referring now to the structure shown in Fig. 2, much of the mechanism is identical with that shown in Fig. 1, and where this is the case the same reference numerals are used with the letter "a". To summarize:

The parts 6a to 49a are identical with the parts 6 to 49 of Fig. 1. A single leak-port 151 takes the place of the leak-ports 51 and 52, and a single valve member 159, fulcrumed at 160 and weighted at 161 to urge it in a port-closing direction, is used. A single adjusting screw 164 is used, and in the example illustrated is mounted in the lever 47a, though it is immaterial whether it be mounted in the lever or in the valve element as indicated in Fig. 1.

The relay 53a is identical with the relay 53 and to simplify the drawings the reference numerals for the component parts of the relay have been omitted in Fig. 2. The branch line 55a and needle valve 56a are also identical with similarly numbered parts of Fig. 1, and lead to the working space Ba. The pipe 72a leads from relay 53a to the leak-port 151.

In place of the relay 54 use is made of what is called a reversed relay 154, which is constructed in accordance with the disclosure of the Otto Patent No. 1,726,409 dated August 27, 1929. This differs from the relay already described in that upon closure of its leak-port the pressure in the branch line is lowered. This result is secured by a re-arrangement of the diaphragm mechanism, and the construction of the relay 154 will now be explained.

The supply line 41a leads to a cavity 166 from which lead two passages. The passage 167 leads past the throttling needle valve 168 to the control space 169 which in this instance is the space between two flexible diaphragms, a small diaphragm 173 and a larger diaphragm 174. The space between these diaphragms is connected by a passage 171 and pipe 172 with leak-port 151. The space forward of the larger, front diaphragm 174 is vented to atmosphere at 175. The diaphragms are connected at their middle by a hub member 176 which has a through port leading to the space forward of the diaphragm 174 which, as stated, is vented to atmosphere at 175. A coil compression spring 170 urges the diaphragm inward, and this spring is used because in this form of the device the differential pressures act in the same way instead of acting in opposition to each other as they do in the relay 53a. Passage 177 leads from the cavity 166 to the space around a spring-urged needle valve 178 which serves as a combined admission and exhaust valve. It acts as an exhaust valve by controlling the through port in hub member 176, and as an admission valve by controlling the seat 179.

It will be observed that the motion of the differential diaphragms 173 and 174 controls the admission and exhaust action of the valve 178, and thus controls the pressure in the chamber 181, which chamber is connected by passage 182 through needle valve 58a and branch line 57a with the working space Aa. Consequently, the variable throttling of the leak-port 151 produces variable pressures in the control chambers of the two relays 53a and 154, but since the relays respond to a given change of control pressure in reverse senses, the pressure in Aa will be increased as the pressure in Ba is reduced, and vice versa. With this device the parts are so adjusted that when the lever 47a is in its neutral position, the leak-port 151 is open to part capacity.

The operation of the device will be readily understood, for the thermostatic mechanism controls the pressure in the chamber 27a, and this pressure in conjunction with the position of lever 17a determines the position of the lever 47a and consequently the degree of throttling of the leak-port 151. This throttling establishes the control pressures and the relays establish reversely varying pressures in the two working spaces. The two mechanisms are essentially equivalent, the difference being that in Fig. 1 the reverse action is established by using two reverse-acting leak ports, while in Fig. 2 there is no reversal of action at the leak-port, the reversal being secured by means of the relays. There is no use in employing two leak-ports in place of the single leak-port 151. The same effect could be had with two similarly acting leak-ports, but absolute identity of action can be secured with a single leak-port and would be very difficult to secure with two. However, generally considered, the single leak-port controlling both relays is functionally identical with two similarly controlled leak-ports each controlling a corresponding relay, and an express recognition of this fact is stated to avoid any misconception on this point.

In the embodiments of Figs. 1 and 2, the damper mechanism is neutral so far as position is concerned. In some practical applications it might be desirable to have the damper open fully or close tight when pressure in line 41 (or 41a) is depleted either by failure of the supply or by the action of some control. A simple mode of accomplishing this is shown in Fig. 3 in which the parts 6c to 9c inclusive correspond to similarly numbered parts in Figs. 1 and 2. Here a weight 91 acts through rack 92 and pinion 93 to bias the damper in one direction (closing direction shown) with a uniform force. Where such an arrangement is used the strength of spring 44 (44a) may be changed to compensate.

In Fig. 4 a similar scheme is shown. Parts 6d to 9d correspond to parts similarly numbered in Figs. 1 and 2. Here the weight 94 adjustable on arm 95 exerts a force on the damper which varies with the angular position of the arm. In this case the damper is urged closed by a force which increases as the damper opens. This typical arrangement may be varied by the exercise of mechanical skill to secure a wide range of varying characteristics.

Figure 5:
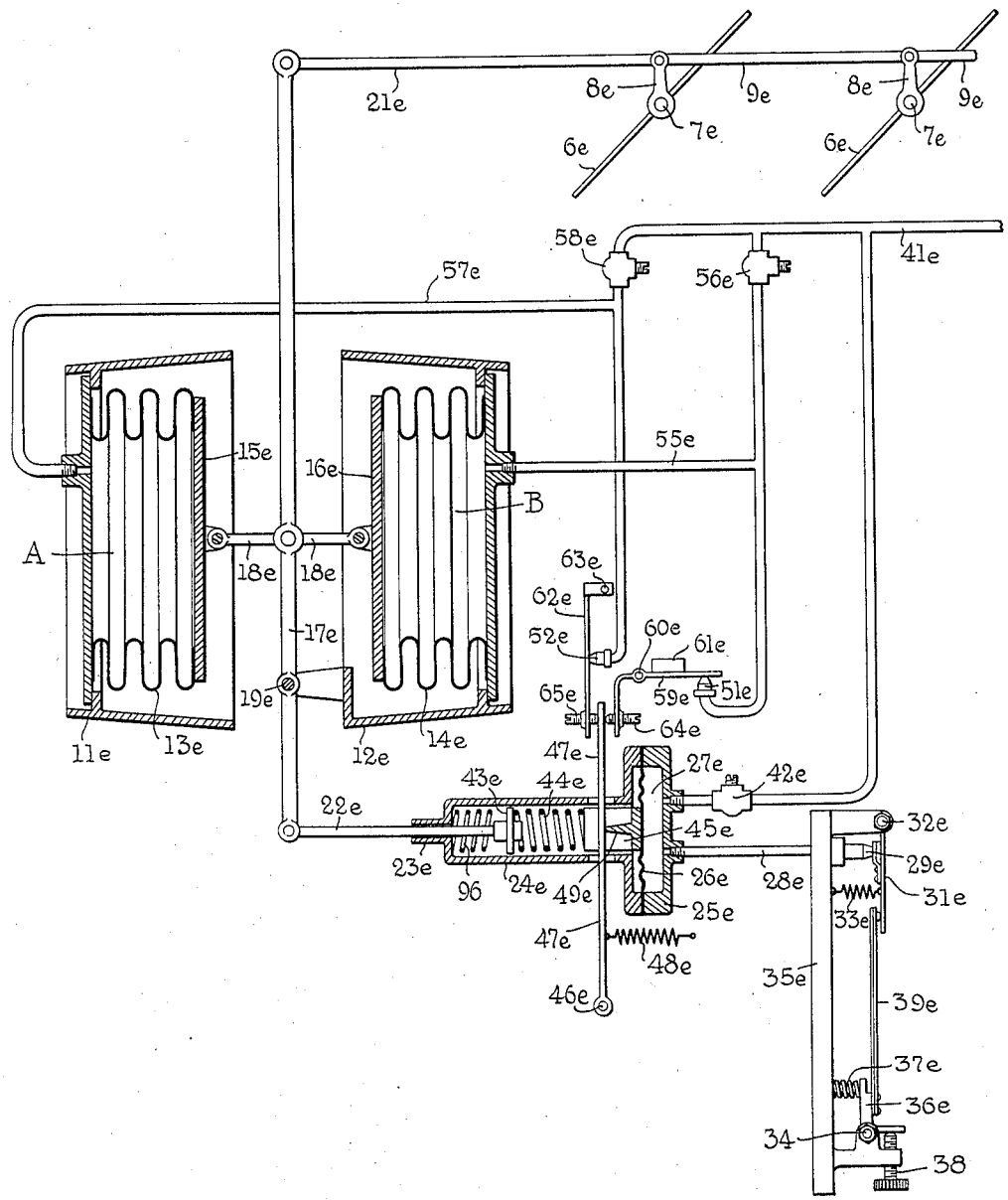
Fig. 5 is a sectional diagram, similar to Fig. 1, but showing the system with the pressure motors controlled directly by the leak-ports without relays, and also showing a modified form of pilot mechanism.

To secure varying characteristics without biasing the damper, recourse may be had to means which modify the characteristic of spring 44 (or 44a). The pilot mechanism shown in Fig. 5 is typical of this idea, and here parts corresponding to parts in Figs. 1 and 2 are identified by similar numerals with the letter e. A spring 96 modifies the action of spring 44e through a portion only of the range of action of spring 44e. As shown spring 96 opposes spring 44e but other arrangements are obviously possible.

While the mechanism of the principal forms and of the modifications has been described in considerable detail, a wide range of equivalents is available, and substitution is contemplated. The particular relays chosen for description are commercial forms which have enjoyed commercial adoption, but approximately equivalent relays are known and might be substituted. The function of a relay is to accelerate the action of the leak-port. It is a familiar expedient in the temperature control art, where rapid action is not considered essential, to omit the relay altogether and to cause the leak-port to control directly the pressure in the motor which it regulates. Consequently, in the form of Fig. 1 particularly it is possible to omit the relays altogether, as shown in Fig. 5.

The mechanism shown in Fig. 5 is identical with that of Fig. 1 except for the omission of the relays, and the addition of the spring 96 to the pilot mechanism. Parts in Fig. 5 similar to those of Fig. 1 are identified by the same reference characters as in Fig. 1 with the addition of "e".

The description of operation given for Fig. 1 is applicable to the system of Fig. 5, it being understood, however, that the pressure motors of Fig. 5 are subject at all times to pressure derived from the source of elastic fluid, and also, that the action of spring 44e is modified in a portion of its range by the spring 96. Obviously this spring may be omitted, as in Fig. 1, if its action is not desired. The system of Fig. 5 will operate satisfactorily, although it is desirable, for best results, to restrict the capacity of the bellows A and B and to place the leak-ports closely adjacent to the bellows, so that the volumes to be vented through the leak ports are not disproportionate to the volumes to be controlled.

In certain of the claims the term "leak valve" will be used in a generic sense with reference to the parts designated in the specification as leak-ports and throttling valves or pads co-acting therewith. The term "leak valve" as used in the claims implies only the restricted rate of flow characteristic of devices of this sort and is not intended to limit the position of the valve to the discharge side of the control chamber. In the temperature regulating art two leak valve control systems have long been recognized as substantial equivalents. In the form chosen for illustration in this case, and customarily used by applicant's assignee, air is supplied to the chamber through a throttling restriction whose capacity is less than the maximum capacity of the leak valve which controls venting flow. The other system which is also in commercial use, involves the use of a constant vent from the chamber in conjunction with a variable leak supply valve whose maximum capacity exceeds the capacity of the vent. In each of these schemes the pressure in the chamber is varied by variably throttling a minute or leak flow through the chamber.

What is claimed is:—

1. In a control system, the combination of a device to be shifted progressively to different positions; a double-acting elastic fluid expansible chamber motor connected to shift said device, said motor having opposed working spaces; a shiftable member; means for developing on said member a force which varies in response to variable atmospheric conditions; means for developing on said member a second force opposing the first and varying in response to the shifting of said device; and means including a source of elastic fluid under pressure and at least one leak valve controlled by said member for establishing in said working spaces continuously effective fluid pressures which vary in relatively reverse senses in the two working spaces under the control of said member.

2. In a control system, the combination of a device to be shifted progressively to different positions; a double-acting expansible chamber motor connected to shift said device, said motor having opposed working spaces; a shiftable member; means for developing on said member a force which varies in response to variable atmospheric conditions; means for developing on said member a second force opposing the first and varying in response to the shifting of said device; and means including a source of elastic fluid under pressure, at least one leak valve controlled by said member, and two leak-valve controlled fluid pressure relay valves, one for each working space, the last-named means serving to establish in said working spaces fluid pressures which vary in relatively reverse senses in the two working spaces under the control of said member.

3. The combination defined in claim 2 in which two leak valves, one for each relay valve, are used.

4. The combination defined in claim 2 in which two leak valves are arranged to be controlled in relatively reverse senses by said member, and the relays controlled thereby are similar.

5. The combination defined in claim 2 in which the two relays operate in relatively reverse senses.

6. The combination defined in claim 2 in which a single leak valve controls both relays and the relays operate in relatively reverse senses.

7. In a control system, the combination of a device to be shifted progressively to different positions; a source of pressure fluid; a double acting expansible chamber motor connected to shift said device, said motor having opposed working spaces; a movable abutment; means including an element responsive to variable atmospheric conditions and a valve controlled thereby for developing a variable fluid pressure on said abutment; adjustable means controlled by the position of said device for variably loading said abutment in opposition to said fluid pressure; and means including at least one leak valve controlled by said abutment and two leak-valve-controlled fluid pressure relay valves, one for each working space, the last-named means serving to establish in said working spaces fluid pressures which vary in relatively reverse senses in the two spaces under the control of said abutment.

8. The combination defined in claim 7 in which two leak valves, one for each relay, are used.

9. The combination defined in claim 7 in which two leak valves are arranged to be controlled in relatively reverse senses by said abutment, and the relays controlled by respective leak valves are similar.

10. The combination defined in claim 7 in which the two relays operate in relatively reverse senses.

11. The combination defined in claim 7 in which a single leak valve controls both relays and the relays operate in relatively reverse senses.

12. In a control system, a controlled device; a source of elastic pressure fluid; a pair of opposed pressure responsive devices, each subject at all times to pressure derived from said source of elastic fluid and connected to said controlled device; a movable abutment; means actuated by the motion of said controlled device to load said abutment variably; valve means controlling the development of fluid pressure in said pressure responsive devices, said valve means being actuated by the motion of said movable abutment; and means responsive to variable atmospheric conditions to establish a variable pressure on said abutment acting in opposition to said loading means.

13. The combination defined in claim 12, in which the means responsive to variable atmospheric conditions comprises a leak-port and a responsive element for variably throttling the same.

14. The combination defined in claim 12 in which the loading means actuated by the motion of the controlled device comprises yielding force transmitting members which are put into and out of action successively.

15. The combination defined in claim 12 in which the loading means actuated by the motion of the controlled device comprises a plurality of springs at least one of which is active through only a portion of the range of such motion.

16. In a control system, the combination of a device to be shifted progressively to different positions; a continuously effective double-acting expansible chamber motor connected to shift said device and including opposed working spaces; a shiftable member; means for developing on said shiftable member a force which varies in response to the shifting of said device; means for developing on said member an opposing force which varies in response to variable atmospheric conditions; and means including a source of elastic fluid under pressure and two combined admission and exhaust valves supplied at all times with pressure fluid thereby, said admission and exhaust valves being associated with respective working spaces and operatively related to said shiftable member to establish variable opposing pressures in said working spaces in response to the movements of said member.

17. The combination defined in claim 16, in which the operative relation between the shiftable member and the admission and exhaust valves includes valve means controlled by said member and fluid pressure motor means actuated by the last-named valve means and connected to operate said admission and exhaust valves.

18. In a control system, the combination of a device to be shifted progressively to different positions; a source of pressure fluid; a double acting expansible chamber motor connected to shift said device, said motor having opposed working spaces; a movable abutment; means including an element responsive to variable atmospheric conditions and a valve controlled thereby for developing a variable fluid pressure on said abutment; adjustable means controlled by the position of said device for variably loading said abutment in opposition to said fluid pressure; and means including a plurality of leak valves, one for each of said working spaces for establishing in said working spaces fluid pressures which vary in relatively reverse senses in the two spaces under the control of said abutment.

CARL A. OTTO.